United States Patent
Bollmann et al.

(10) Patent No.: US 9,023,910 B2
(45) Date of Patent: May 5, 2015

(54) LOW-DENSITY POLYURETHANE SHOE SOLES OR SOLE PARTS WITH HIGH REBOUND RESILIENCE AND LOW COMPRESSION SET

(71) Applicant: BASF SE, Ludwigshafen (DE)

(72) Inventors: Heinrich Bollmann, Alfhausen (DE); Andre Kamm, Bohmte (DE); Anand G. Huprikar, Novi, MI (US); Ulrich Holwitt, Osnabrueck (DE)

(73) Assignee: BASF SE, Ludwigshafen (DE)

( * ) Notice: Subject to any disclaimer, the term of this patent is extended or adjusted under 35 U.S.C. 154(b) by 128 days.

(21) Appl. No.: 13/745,199

(22) Filed: Jan. 18, 2013

(65) Prior Publication Data

US 2013/0197118 A1    Aug. 1, 2013

Related U.S. Application Data

(60) Provisional application No. 61/587,686, filed on Jan. 18, 2012.

(51) Int. Cl.
| | | |
|---|---|---|
| *C08G 18/00* | (2006.01) | |
| *C08J 9/12* | (2006.01) | |
| *B29C 44/34* | (2006.01) | |
| *B29C 44/02* | (2006.01) | |
| B29L 31/50 | (2006.01) | |
| B29K 75/00 | (2006.01) | |

(52) U.S. Cl.
CPC ............. *C08J 9/125* (2013.01); *B29C 44/3442* (2013.01); *B29K 2995/0063* (2013.01); *B29K 2995/007* (2013.01); *B29L 2031/504* (2013.01); *B29K 2075/00* (2013.01); *B29C 44/02* (2013.01)

(58) Field of Classification Search
CPC ............... C08G 2101/0058; C08G 2101/0083; C08G 18/14; C08G 18/302; C08G 18/4018; C08G 18/6611
USPC ......................................... 521/172, 174, 176
See application file for complete search history.

(56) References Cited

U.S. PATENT DOCUMENTS

| | | |
|---|---|---|
| 3,304,273 A | 2/1967 | Stamberger |
| 3,383,351 A | 5/1968 | Stamberger |
| 3,523,093 A | 8/1970 | Stamberger |
| 3,615,972 A | 10/1971 | Morehouse, Jr. et al. |
| 4,294,934 A * | 10/1981 | Grogler et al. ................. 521/160 |
| 4,559,366 A * | 12/1985 | Hostettler ........................ 521/51 |
| 4,764,537 A | 8/1988 | Horn et al. |
| 5,710,185 A * | 1/1998 | Volkert et al. .................... 521/51 |
| 2007/0179208 A1* | 8/2007 | Schutte et al. ................... 521/99 |
| 2009/0234039 A1* | 9/2009 | Schutte et al. .................. 521/137 |
| 2010/0190880 A1* | 7/2010 | Kamm et al. ................... 521/137 |
| 2010/0230879 A1* | 9/2010 | Watanabe et al. ............. 267/292 |
| 2012/0095122 A1* | 4/2012 | Zhou et al. ..................... 521/159 |

FOREIGN PATENT DOCUMENTS

| | | |
|---|---|---|
| DE | 111394 | 7/1900 |
| DE | 1 152 536 | 8/1963 |
| DE | 1 152 537 | 8/1963 |
| DE | 36 07 447 A1 | 9/1987 |
| EP | 0 153 639 A2 | 9/1985 |
| EP | 0 250 351 A2 | 12/1987 |
| EP | 1 042 384 B1 | 3/2002 |
| EP | 1 225 199 A1 | 7/2002 |
| EP | 1 756 187 B1 | 4/2008 |
| WO | WO 2005/098763 A2 | 10/2005 |

\* cited by examiner

*Primary Examiner* — Michael L Leonard
(74) *Attorney, Agent, or Firm* — Oblon, McClelland, Maier & Neustadt, L.L.P.

(57) ABSTRACT

A process for producing a polyurethane shoe sole having an article density of 100 to 350 g/L and being made from an organic polyisocyanate, a polyol, a blowing agent consisting of water, and optionally a crosslinking and/or chain-extending agent, a catalyst, and other auxiliaries and/or additives. First, polyisocyanate, polyol and any crosslinking and/or chain-extending agent are mixed and reacted at a temperature of 110° C. to 180° C. to give a prepolymer having polyisocyanate groups. Second, the isocyanate-terminated prepolymer obtained and any remaining polyisocyanate are mixed with any remaining polyol, blowing agent comprising water, and any remaining crosslinking and/or chain-extending agent and also any catalyst and other auxiliaries and/or additives are introduced into a mold and allowed to fully react to give a polyurethane shoe sole.

20 Claims, No Drawings

LOW-DENSITY POLYURETHANE SHOE SOLES OR SOLE PARTS WITH HIGH REBOUND RESILIENCE AND LOW COMPRESSION SET

The present invention relates to a process for producing a polyurethane shoe sole having an article density of 100 to 350 g/L, which comprises utilizing (a) an organic polyisocyanate, (b) a polyol, (c) a blowing agent comprising water, and optionally (d) a crosslinking and/or chain-extending agent, (e) a catalyst, and (f) other auxiliaries and/or additives, where a first step comprises polyisocyanate (a), polyol (b) and any crosslinking and/or chain-extending agent (d) being mixed and reacted at a temperature of 110° C. to 180° C. to give a prepolymer having polyisocyanate groups and a second step comprises the isocyanate-terminated prepolymer obtained and any remaining polyisocyanate (a) being mixed with any remaining polyol (b), blowing agent comprising water (c), and any remaining crosslinking and/or chain-extending agent (d) and also any catalyst (e) and other auxiliaries and/or additives (f), being introduced into a mold and allowed to fully react to give a polyurethane shoe sole. The present invention further relates to a polyurethane shoe sole which comprises utilizing (a) an organic polyisocyanate, (b) a polyol, (c) a blowing agent comprising water, and optionally (d) a crosslinking and/or chain-extending agent, (e) a catalyst, and (f) other auxiliaries and/or additives, where a first step comprises polyisocyanate (a), polyol (b) and any crosslinking and/or chain-extending agent (d) being mixed and reacted at a temperature of 110° C. to 180° C. to give a prepolymer having polyisocyanate groups and a second step comprises the isocyanate-terminated prepolymer obtained and any remaining polyisocyanate (a) being mixed with any remaining polyol (b), blowing agent comprising water (c), and any remaining crosslinking and/or chain-extending agent (d) and also any catalyst (e) and other auxiliaries and/or additives (f), being allowed to fully react to form a polyurethane foam having a density of 100 to 350 g/L and a polyurethane shoe sole being shaped out of the polyurethane foam. The polyurethane foam is shaped, for example, by cutting, diecutting, shaving and/or thermoforming, optionally together with further materials, such as further polyurethane foams or ethylene-vinyl acetate.

The present invention further relates to a polyurethane shoe sole that is obtainable by a process of the present invention.

There has been a trend in recent years toward shoe soles which are lighter in weight. Low density is an essential requirement of the sole material in the sport shoe sector in particular. Therefore, midsoles comprising foamed poly(ethylene-co-vinyl acetate) (EVA) are generally used in this sector. These materials can be used to achieve a low density of about 150 to 250 g/L. New midsoles comprising EVA are further notable for high rebound resilience. The disadvantage with EVA midsoles is their poor compression set. Compared with EVA, polyurethane displays a distinctly better compression set even at low densities. This is known to a person skilled in the art and is also described in the literature, for example Brückner et. al. Kunststoffe September 2010.

Yet reducing the density of polyurethane shoe soles, especially for article densities of less than 300 g/L, leads to problems with producing the shaped articles. Cell morphology is frequently irregular, causing the articles to have nonuniform mechanical properties. Even with optimally shaped polyurethane foam articles having densities less than 300 g/L, the mechanical properties of conventional polyurethane shoe soles, especially their rebound resilience, decline so severely that their usefulness as shoe soles is limited.

Filled polyols, known as polymer polyols, can be used to improve the mechanical properties and the hardness, for example. EP 1756187, for instance, discloses a polyurethane shoe sole from 120 to 300 g/L in density, which is obtained by reacting polyisocyanates with polyesterols and polymer polyesterols. But polymer polyols are only obtainable via a fairly inconvenient process and hence are fairly costly. They are also not straightforward to process, since their high viscosity frequently leads to insufficient mixing with the isocyanate component and also to insufficient packing of the mold.

A person skilled in the art knows that the use of specific polyols such as, for example, polytetrahydrofuran makes it possible to obtain shaped articles having good compression sets and high resiliencies. EP 1 042 384 for example describes such shaped articles for use as shoe soles. What is disadvantageous with such systems is that these specific polyols are extremely costly and have a comparatively low mechanical level versus polyurethanes based on polyesterols.

EP 1 225 199 discloses a process useful for producing low-density shaped polyurethane articles having relatively high resiliencies. The process of EP 1 225 199 utilizes specific DMC polyether polyols endcapped with ethylene oxide. The disadvantage with these polyols is that DMC polyols having an EO endcap are obtained via a costly and inconvenient hybrid-type process. EP 1 225 199 further utilizes a specific process for producing the shaped polyurethane articles. In this process, carbon dioxide has to be dispersed/dissolved into the components. This is only possible with special apparatus.

The problem addressed by the present invention was therefore that of providing a polyurethane shoe sole from 100 to 350 g/L in density which is simple to produce and has outstanding mechanical properties, especially a high rebound resilience and a low compression set.

The problem addressed by the present invention is solved by a process for producing a polyurethane shoe sole having an article density of 100 to 350 g/L, which comprises utilizing (a) an organic polyisocyanate, (b) a polyol, (c) a blowing agent comprising water, and optionally (d) a crosslinking and/or chain-extending agent, (e) a catalyst, and (f) other auxiliaries and/or additives, where a first step comprises polyisocyanate (a), polyol (b) and any crosslinking and/or chain-extending agent (d) being mixed and reacted at a temperature of 110° C. to 180° C. to give a prepolymer having polyisocyanate groups and a second step comprises the isocyanate-terminated prepolymer obtained and any remaining polyisocyanate (a) being mixed with any remaining polyol (b), blowing agent comprising water (c) and any remaining crosslinking and/or chain-extending agent (d) and also any catalyst (e) and other auxiliaries and/or additives (f), being introduced into a mold and allowed to fully react to give a polyurethane shoe sole.

The present invention further relates to a polyurethane shoe sole having a density of 100 to 350 g/L, which comprises utilizing (a) an organic polyisocyanate, (b) a polyol, (c) a blowing agent comprising water, and optionally (d) a crosslinking and/or chain-extending agent, (e) a catalyst, and (f) other auxiliaries and/or additives, where a first step comprises polyisocyanate (a), polyol (b) and any crosslinking and/or chain-extending agent (d) being mixed and reacted at a temperature of 110° C. to 180° C. to give a prepolymer having polyisocyanate groups and a second step comprises the isocyanate-terminated prepolymer obtained and any remaining polyisocyanate (a) being mixed with any remaining polyol (b), blowing agent comprising water (c), and any remaining crosslinking and/or chain-extending agent (d) and also any catalyst (e) and other auxiliaries and/or additives (f), being allowed to fully react to form a polyurethane foam having a density of 100 to 350 g/L and a polyurethane shoe sole being shaped out of the polyurethane foam. The polyurethane foam is shaped, for example, by cutting, diecutting, shaving and/or thermoforming. During the shaping of the polyurethane shoe sole, it is optionally possible to use further materials, such as further polyurethane foams or ethylene-vinyl acetate.

The present invention further relates to a polyurethane shoe sole that is obtainable by a process of the present invention.

Polyurethane shoe soles for the purposes of the present invention comprise one-part shoe soles, so-called combisoles, midsoles, insert soles or shoe sole parts, such as heel parts or ball parts. By insert soles are meant insert parts for the forefoot, insert parts for the whole foot or footbeds. Shoe soles within the meaning of the present invention further comprise polyurethane hybrid shoe soles which, in addition to the polyurethane of the present invention, comprise further materials, such as further polyurethanes and/or ethylene-vinyl acetate.

The polyurethane shoe soles of the present invention have a hardness of 15 to 75 Asker C and more preferably between 25 and 65 Asker C, measured to JIS K 7312. The shoe soles of the present invention further preferably have tensile strengths of above 0.5 N/mm$^2$, more preferably of above 0.8 N/mm$^2$ and especially of above 1.0 N/mm$^2$, measured to DIN 53504. The shoe soles of the present invention further preferably have an elongation of above 100%, more preferably of above 150% and especially of above 200%, measured to DIN 53504. The shoe soles of the present invention further preferably have a rebound resilience to DIN 53 512 of 20 to 70%, more preferably of 30 to 60% and especially of 40 to 60%. The shoe soles of the present invention also preferably have a tongue tear strength of above 1 N/mm and preferably of above 1.5 N/mm, measured to ASTM D3574. In addition, the polyurethane shoe soles of the present invention preferably have a compression set as measured in line with DIN EN ISO 1856 (A cylindrical test specimen 16 mm in Ø and the initial height $h_0$=10 mm is compressed to the height $h_1$=5.0 mm and stored at 50° C. for 6 h. After decompressing the test specimen and storage under 23/50 standard conditions, the height $h_2$ of the test specimen is determined after 30 min and the compression set is calculated as per the following formula: compression set=(($h_0$–$h_2$)/($h_0$–$h_1$))*100%) of below 20%, more preferably of below 15% and especially of below 12%.

Finally, the polyurethane shoe soles of the present invention have a stiffness which can be determined as follows: A test specimen having the dimensions X×Y×Z=40 mm×40 mm×10 mm, as also used for determining the rebound resilience, is stored, before testing, at 80° C. for 4 hours and then at (23±2)° C. and (50±5)% relative humidity for not less than 24 hours and for not more than 120 hours. The test takes place under these same climatic conditions. The test specimen is placed in the Z-direction between two plane-parallel plates. The plates travel toward each other in the Z-direction at 0.1 mm/s, a zero travel point being set at a compression force of 2 N. Two setting cycles follow wherein the plates twice travel from this zero travel point to compress the test specimen at a speed of 0.1 mm/s down to a jounce of 5 mm and return back to the zero travel point. Following a delay time of 30 s, a new zero travel point is defined at a pre-force of 2 N and a speed of 0.1 mm/s. This is followed by the measuring cycle. Again, the test specimen is compressed at a speed of 0.1 mm/s down to a jounce of 5 mm and relaxed back to the new zero travel point, while the force is recorded throughout the compression and extension cycle. The stiffness c is determined as secant modulus in the jounce cycle between a force value of 20 N and a force value of 80 N in accordance with the following equation:

$$c = \frac{80N - 20N}{z_{80N} - z_{20N}}$$

The compression energy Ws, also known as storage energy, is likewise determined, as the integral of the force over the path between the jounce of 0 mm and 5 mm during the measuring cycle:

$$Ws = \int_{z=0\text{ mm}}^{z=5\text{ mm}} F(z)dz$$

during compression

In the same way, the decompression energy We, which the test specimen performs during the unloading phase in the measuring cycle, is determined as the integral of the force over the path between the jounce of 0 mm and 5 mm.

$$We = \int_{z=0\text{ mm}}^{z=5\text{ mm}} F(z)dz$$

during decompression

The difference between the compression energy and the decompression energy is referred to as the loss energy Wv: Wv=Ws–We. Damping D computes according to $$D = \frac{Wv}{Ws}$$

The stiffness c of the polyurethane shoe soles of the present invention is preferably below 1000 N/mm and more preferably between 30 and 300 N/mm. The storage energy Ws of the polyurethane shoe soles according to the present invention is preferably below 5 Nm, more preferably between 0.1 and 2.5 Nm and most preferably between 0.1 and 1 Nm. The damping of polyurethane shoe soles according to the present invention is preferably below 50%, more preferably below 40% and most preferably below 30%.

The polyurethane shoe soles of the present invention are more preferably outsoles, midsoles, or sole parts, such as heel parts, ball parts, insert parts for the forefoot, insert parts for the whole foot or footbeds.

The polyurethane shoe soles of the present invention have a density of 100 to 350 g/L, preferably 120 to 280 g/L and more preferably of 130 to less than 250 g/L and especially in the range from 150 to 220 g/L. This density of the polyurethane shoe sole is to be understood as meaning the averaged density over the entire foam, i.e., in the case of integral foams, this refers to the average density of the entire foam including core and skin. Further materials besides the polyurethane of the present invention, in the case of hybrid shoe soles for example, are not included when the density is determined.

The organic polyisocyanates (a) used to produce the comprise polyurethane shoe soles of the present invention the prior art aliphatic, cycloaliphatic and aromatic two- or polyfunctional isocyanates (constituent a-1) and also any desired mixtures thereof. Examples are monomeric methanediphenyl diisocyanate (MMDI), such as 4,4'-methanediphenyl diisocyanate, 2,4'-methanediphenyl diisocyanate, the mixtures of monomeric methanediphenyl diisocyanates and higher-nuclear homologs of methanediphenyl diisocyanate (polymeric MDI), naphthalene diisocyanate (NDI), especially 1,5-naphthalene diisocyanate, 3,3'-dimethyl-4,4'-diisocyanato-biphenyl (TODI), p-phenylene diisocyanate (PPDI), tetramethylene diisocyanate, hexamethylene diisocyanate (HDI), isophorone diisocyanate (IPDI), 2,4- or 2,6-tolylene diisocyanate (TDI) or mixtures thereof.

Preference is given to using NDI, mixtures of NDI and MDI or more preferably 4,4'-MDI. The more preferably used 4,4'-MDI may comprise from 0 to 20 wt % of 2,4'-MDI and small amounts, up to about 10 wt %, of allophanate- or ureto-neimine-modified polyisocyanates. Small amounts of polyphenylene polymethylene polyisocyanate (polymer MDI) can also be used. The total amount of these high-functionality polyisocyanates should not exceed 5 wt %, based on the total weight of employed isocyanate (a).

The polyisocyanate component (a) is at least partly mixed in a first step with polyols (b) and optionally crosslinking and/or chain-extending agents (d) before the mixture is reacted at 110 to 180° C., preferably at 130 to 170° C. and more preferably 140 to 155° C. to give a prepolymer having isocyanate groups.

The resulting isocyanate-terminated prepolymer according to the invention preferably has an NCO content of 2 to 20 wt %, more preferably 2 to 10 wt % and especially 4 to 8 wt %.

Preferably, the isocyanate-terminated prepolymer is prepared using not less than 50 wt %, more preferably not less than 80 wt %, even more preferably not less than 90 wt % and especially 100 wt % of polyol (b).

The isocyanate-terminated prepolymer is further prepared using not less than 50 wt %, more preferably not less than 80 wt %, even more preferably not less than 90 wt % and especially 100 wt % of isocyanate (a).

Remaining isocyanate (a) and remaining polyol (b) can then be used unchanged and/or in the form of conventional prepolymers for producing the polyurethane shoe soles of the present invention. Conventional prepolymers are obtained by reacting the above-described polyisocyanates (a-1), for example at temperatures of 30 to 100° C. and preferably at approximately 80° C., with polyols (b) and optionally crosslinking and/or chain-extending agents (d) to give the conventional prepolymer.

Useful polyols b) include for example polyetherols or polyesterols having two or more isocyanate-reactive hydrogen atoms. Polyols b) preferably have a number-average molecular weight of above 450 g/mol, more preferably of above 500 to below 12,000 g/mol and especially from 600 to 8000 g/mol.

Polyetherols are obtained by known processes, for example via anionic polymerization with alkali metal hydroxides or alkali metal alkoxides as catalysts and in the presence of at least one starter molecule comprising 2 to 3 reactive hydrogen atoms in bonded form, or via cationic polymerization with Lewis acids, such as antimony pentachloride or boron fluoride etherate formed from one or more alkylene oxides having 2 to 4 carbon atoms in the alkylene moiety. Suitable alkylene oxides are for example 1,3-propylene oxide, 1,2-butylene oxide, 2,3-butylene oxide and preferably ethylene oxide and 1,2-propylene oxide. Monomeric tetrahydrofuran can also be used. Useful catalysts further include multimetal cyanide compounds, so-called DMC catalysts. The alkylene oxides can be used singly, alternatingly in succession or as mixtures. Preference is given to using pure 1,2-propylene oxide or mixtures of 1,2-propylene oxide and ethylene oxide, wherein the ethylene oxide is used in amounts of above 0 to 50% as ethylene oxide end block ("EO-cap"), so the resulting polyols have primary OH end groups to an extent above 70%.

Possible starter molecules are preferably water or 2- and 3-hydric alcohols, such as ethylene glycol, 1,2-propanediol, 1,3-propanediol, diethylene glycol, dipropylene glycol, 1,4-butanediol, glycerol or trimethylolpropane.

The polyether polyols, preferably polyoxypropylene polyols or polyoxypropylene-polyoxy-ethylene polyols, preferably have an average functionality of 1.7 to 3 and number-average molecular weights of 1000 to 12,000, preferably of 1200 to 8000 g/mol, especially from 1500 to 6000 g/mol and even more preferably in the range from 2000 to 6000 g/mol.

Polyester polyols are obtainable for example from organic dicarboxylic acids having 2 to 12 carbon atoms, preferably aliphatic dicarboxylic acids having 4 to 6 carbon atoms and polyhydric alcohols, preferably diols, having 2 to 12 carbon atoms, preferably 2 to 6 carbon atoms. Useful dicarboxylic acids include for example: succinic acid, glutaric acid, adipic acid, pimelic acid, suberic acid, azelaic acid, sebacic acid, decanedicarboxylic acid, maleic acid, fumaric acid, phthalic acid, isophthalic acid and terephthalic acid. The dicarboxylic acids can be used not only individually but also mixed with each or one another. Instead of the free dicarboxylic acids, it is also possible to use the corresponding dicarboxylic acid derivatives, for example dicarboxylic esters of alcohols having 1 to 4 carbon atoms or dicarboxylic anhydrides. Preference is given to using dicarboxylic acid mixtures comprising succinic, glutaric and adipic acids in mixing ratios of, for example, from 20 to 35:35 to 50:20 to 32 parts by weight, and especially adipic acid. Examples of di- and polyhydric alcohols, especially diols, are: ethanediol, diethylene glycol, 1,2-propanediol, 1,3-propanediol, dipropylene glycol, 2-methyl-1,3-propanediol, 1,4-butanediol, 2-methyl-1,4-butanediol, 1,5-pentanediol, 3-methyl-1,5-pentanediol, 1,6-hexanediol, 1,10-decanediol, glycerol and trimethylolpropane. Preference is given to using ethanediol, diethylene glycol, 2-methyl-1,3-propanediol, 1,4-butanediol, 1,5-pentanediol and 1,6-hexanediol. The diols can be used not only individually but also mixed with each or one another. Preference is given to using a mixture of ethanediol and 1,4-butanediol. It is also possible to use polyester polyols formed from lactones, e.g., ε-caprolactone or hydroxy carboxylic acids, e.g., ω-hydroxycaproic acid.

To prepare the polyester polyols, the organic, for example aromatic and preferably aliphatic, polycarboxylic acids and/or derivatives and polyhydric alcohols can be polycondensed in the absence of catalysts or preferably in the presence of esterification catalysts, advantageously in an atmosphere of inert gas, for example nitrogen, carbon monoxide, helium or argon, in the melt at temperatures of 150 to 250° C., preferably 180 to 220° C., optionally under reduced pressure, to the desired acid number, which is preferably less than 10 and more preferably less than 2. In a preferred embodiment, the esterification mixture is polycondensed at the abovementioned temperatures to an acid number of 80 to 30, preferably 40 to 30, under atmospheric pressure and then under a pressure of less than 500 mbar, preferably 50 to 150 mbar. Useful esterification catalysts include for example iron, cadmium, cobalt, lead, zinc, antimony, magnesium, titanium and tin catalysts in the form of metals, metal oxides or metal salts. However, the polycondensation can also be carried out in the liquid phase in the presence of diluting and/or entraining agents, for example benzene, toluene, xylene or chlorobenzene in order to distill off the water of condensation azeotropically. To prepare the polyester polyols, the organic polycarboxylic acids and/or derivatives and polyhydric alcohols are advantageously polycondensed in a molar ratio of from 1:1 to 1.8 and preferably from 1:1.05 to 1.2.

The polyester polyols obtained preferably have a functionality of 1.9 to 4, more preferably 1.9 to 3, even more preferably of 1.9 to 2.2 and especially of 2.0 to 2.1, and a number-average molecular weight of 480 to 3000, preferably 1000 to 3000 g/mol and more preferably of 1500 to 2500 g/mol. More particularly, the polyesterols used are exclusively obtained by condensation of diacids and diols.

Useful polyols (b) further include hydroxyl-containing polyesters of carbonic acid with the polyhydric alcohols mentioned, especially those having 4 to 8 carbon atoms, such as 1,4-butanediol, 1,5-pentanediol, 1,6-hexanediol, 1,4-cyclohexanedimethanol, neopentylglycol, 2-methyl-1,3-propanediol, 2-methyl-1,4-butanediol, 2-butyl-2-ethyl-1,3-propanediol, condensation products of hydroxy carboxylic acids, for example ω-hydroxycaproic acid and preferably polymerization products of lactones, for example optionally substituted ε-caprolactones. Preferred polycarbonate polyols are polyhexamethylene carbonate diol, polyhexamethylene-pentamethylene carbonate diol, polyhexamethylene tetramethylene carbonate diol and/or the hydroxyl-containing polyester of carbonic acid with 1,6-hexanediol and 1,4-cyclohexanedimethanol. These are common general knowledge and commercially available.

Useful polyols further include polymer-modified polyols, preferably polymer-modified polyesterols or polyetherols, more preferably graft polyetherols or graft polyesterols, especially graft polyetherols. What is concerned here is a so-called polymer polyol, which typically contains polymers, preferably thermoplastic polymers, at 5 to 60 wt %, preferably 10 to 55 wt %, more preferably 30 to 55 wt % and especially 40 to 50 wt %. These polymer polyesterols are described for example in WO 05/098763 and EP-A-250 351 and are typically obtained by free-radical polymerization of suitable olefinic monomers, for example styrene, acrylonitrile, (meth)acrylates, (meth)acrylic acid and/or acrylamide, in a polyesterol as grafting base. The side chains are generally formed as a result of free radicals transferring from growing polymer chains to polyesterols or polyetherols. The polymer polyol in addition to the graft copolymer comprises, predominantly, the homopolymers of the olefins, dispersed in unmodified polyesterol or, respectively, polyetherol.

A preferred embodiment uses acrylonitrile, styrene, preferably acrylonitrile and styrene, as monomers. The monomers are optionally polymerized in the presence of further monomers, of a macromer, i.e., an unsaturated, free-radically polymerizable polyol, of a moderator, and using a free-radical initiator, usually azo or peroxide compounds, in a polyesterol or polyetherol as continuous phase. This method is described for example in DE 111 394, U.S. Pat. No. 3,304,273, U.S. Pat. No. 3,383,351, U.S. Pat. No. 3,523,093, DE 1 152 536 and DE 1 152 537.

During the free-radical polymerization, the macromers become co-incorporated in the copolymer chain. This results in the formation of block copolymers having a polyester or, respectively, polyether block and a poly(acrylonitrile-styrene) block, which act as compatibilizers at the interface between the continuous phase and the disperse phase and suppress the agglomeration of the polymer polyesterol particles. The proportion of macromers is typically in the range from 1 to 20 wt %, based on the total weight of the monomers used for preparing the polymer polyol.

A polymer polyol is preferably used, if present, together with further polyols (b), for example polyetherols, polyesterols or mixtures comprising polyetherols and polyesterols. These polymer polyols may be present for example in an amount of 7 to 90 wt % or of 11 to 80 wt %, all based on the total weight of component (b). The proportion of polymer polyol is more preferably less than 20 wt %, based on the total weight of component (b). More particularly, no polymer polyol is used.

Mixtures comprising polyesterols are preferably used as polyols (b). The proportion of polyols (b) which is attributable in this case to polyesterols is preferably not less than 30 wt %, more preferably not less than 70 wt % and, more particularly, it is polyesterol which is exclusively used as higher molecular weight compound (b), in which case a polymer polyol based on polyesterol is treated like a polyesterol in this calculation.

Polyurethane shoe soles according to the present invention are further produced in the presence of blowing agents c). These blowing agents c) may comprise water. Useful blowing agents c) in addition to water also include well-known chemically and/or physically acting compounds. Chemical blowing agents are compounds which react with isocyanate to give gaseous products, for example water or formic acid. Physical blowing agents are compounds which are in a dissolved or emulsified state in the polyurethane production feedstocks and vaporize under the conditions of polyurethane formation. They are for example hydrocarbons, halogenated hydrocarbons, and other compounds, for example perfluorinated alkanes, such as perfluorohexane, (hydro)chlorofluorocarbons, and ethers, esters, ketones, acetals or mixtures thereof, for example (cyclo)aliphatic hydrocarbons of 4 to 8 carbon atoms, or hydrofluorocarbons, such as Solkane® 365 mfc from Solvay Fluorides LLC. A preferred embodiment utilizes a blowing agent comprising a mixture comprising at least one of these blowing agents and water, more preferably no physical blowing agents and especially water as sole blowing agent.

The water content in a preferred embodiment is from 0.1 to 3 wt %, preferably from 0.4 to 2.0 wt % and more preferably from 0.6 to 1.5 wt %, based on the total weight of components a) to f).

In a further preferred embodiment, the reaction of components a) to f) is additionally admixed with microbeads containing physical blowing agent. The microbeads can also be used in admixture with the aforementioned blowing agents.

The microbeads typically consist of a shell of thermoplastic polymer and are filled in the core with a liquid, low-boiling substance based on alkanes. The production of such microbeads is described for example in U.S. Pat. No. 3,615,972. The microbeads are generally from 5 to 50 μm in diameter. Examples of suitable microbeads are available under the trade name Expancell® from Akzo Nobel.

The microbeads are generally added in an amount of 0.5 to 5 wt %, based on the total weight of components b) and c). A particularly preferred embodiment utilizes a mixture comprising microbeads and water as a blowing agent without any further physical blowing agents being present. More particularly, water is used as sole blowing agent.

Useful crosslinking and/or chain-extending agents (d) are substances having a molecular weight of preferably below 450 g/mol and more preferably in the range from 60 to 400 g/mol, chain extenders having 2 isocyanate-reactive hydrogen atoms and crosslinking agents having 3 or more isocyanate-reactive hydrogen atoms. These can preferably be used individually or in the form of mixtures. Preference is given to using diols and/or triols having molecular weights less than 400, more preferably from 60 to 300 and especially 60 to 150. Contemplated are for example aliphatic, cycloaliphatic and/or araliphatic diols having 2 to 14, preferably 2 to 10 carbon atoms, such as ethylene glycol, 1,3-propanediol, 1,10-decanediol, 1,2-, 1,3-, 1,4-dihydroxycyclohexane, diethylene glycol, dipropylene glycol and 1,4-butanediol, 1,6-hexanediol and bis(2-hydroxyethyl)hydroquinone, triols, such as 1,2,4-trihydroxycyclohexane, 1,3,5-trihydroxycyclohexane, glycerol and trimethylolpropane, and low molecular weight hydroxyl-containing polyalkylene oxides based on ethylene oxide and/or 1,2-propylene oxide and the aforementioned diols and/or triols as starter molecules. Particular preference is given to using monoethylene glycol, 1,4-butanediol, diethylene glycol, glycerol or mixtures thereof as chain extender (d).

When chain-extending agents, crosslinking agents or mixtures thereof are used, these are advantageously used in amounts of 0.01 to 6 wt %, preferably 0.01 to 3 wt % and especially 0.01 to 0.5 wt %, based on the weight of components (b) and (d). In a particularly preferred embodiment, no diolic chain-extending agent and no crosslinking agent is added.

Useful catalysts (e) for producing the polyurethane shoe soles of the present invention are preferably compounds having a strongly accelerating effect on the reaction of polyols (b) and optionally crosslinking and chain-extending agents (d) and also chemical blowing agent (c) with the organic, optionally modified polyisocyanates (a). Suitable examples are amidines, such as 2,3-dimethyl-3,4,5,6-tetrahydropyrimidine, tertiary amines, such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetra-methylhexanediamine, pentamethyldiethylenetriamine, tetramethyldiaminoethyl ether, bis-(dimethylaminopropyl) urea, dimethylpiperazine, N-methyl-N'-(dimethylaminomethyl)piperazine, N-methyl-N'-(dimethylaminoethyl)piperazine, N-methylimidazole, 1,2-dimethylimidazole, 1-aza-bicyclo[3.3.0]octane and preferably 1,4-diazabicyclo[2.2.2]octane and alkanolamine compounds, such as triethanolamine, triisopropanolamine, N-methyldiethanolamine, N-ethyl-diethanolamine and dimethylethanolamine, or mixtures thereof. Also contemplated are organometallic compounds, preferably organotin compounds, such as tin(II) salts of organic carboxylic acids, e.g., tin(II) acetate, tin(II) octoate, tin(II) ethylhexoate and tin(II) laurate and the dialkyltin(IV) salts of organic carboxylic acids, e.g., dibutyl tin diacetate, dibutyltin dilaurate, dibutyltin maleate and dioctyltin diacetate, and also bismuth carboxylates, such as bismuth(III) neodecanoate, bismuth 2-ethylhexanoate and bismuth octanoate or mixtures thereof. The organometallic compounds can be used alone or preferably combined with strongly basic amines. When component (b) is an ester, it is preferable to use exclusively amine catalysts.

It is preferable to use from 0.001 to 5 wt % and especially from 0.005 to 1 wt % of a catalyst or catalyst combination, based on the weight of component (b). But the catalysts are preferably selected and used in corresponding amounts such that the polyurethane product of the present invention, for example the polyurethane shoe sole of the present invention or the polyurethane of the present invention, can be demolded after not more than 60 minutes, more preferably after 30 minutes and especially after not more than 20 minutes. This holds mutatis mutandis for moldlessly obtained material, for example material produced on endless belts. The indicated times relate to the time span between introducing the reaction mixture into the mold and defect-free demoldability of the polyurethane product.

The reaction mixture for producing the polyurethane shoe soles of the present invention may optionally also include auxiliaries and/or additives (f). Examples are surface-active substances, foam stabilizers, cell regulators, further release agents, fillers, dyes, pigments, hydrolysis control agents, odor-absorbing substances and fungistatic and/or bacteriostatically acting substances.

Useful surface-active substances include for example compounds which serve to augment homogenization of starting materials and are possibly also suitable for regulating the cell structure. Examples are emulsifiers, such as the sodium salts of castor oil sulfates or of fatty acids, and also salts of fatty acids with amines, e.g., diethylamine oleate, diethanolamine stearate, diethanolamine ricinoleate, salts of sulfonic acids, for example alkali metal or ammonium salts of dodecylbenzene- or dinaphthylmethanedisulfonic acid, and ricinoleic acid; foam stabilizers, such as siloxane-oxalkylene interpolymers and other organopolysiloxanes, ethoxylated alkylphenols, ethoxylated fatty alcohols, paraffin oils, castor oil esters, or to be more precise ricinoleic esters, Turkey red oil and peanut oil, and cell regulators, such as paraffins, fatty alcohols and dimethylpolysiloxanes. To improve the emulsifying effect, the cell structure and/or stabilization of the foam it is further possible to use oligomeric acrylates having polyoxyalkylene and fluoroalkane moieties as side groups. The surface-active substances are typically used in amounts of 0.01 to 5 parts by weight, based on 100 parts by weight of component b).

Useful further release agents include for example: reaction products of fatty acid esters with polyisocyanates, salts of amino-containing polysiloxanes and fatty acids, salts of saturated or unsaturated (cyclo)aliphatic carboxylic acids of 8 or more carbon atoms and tertiary amines and also, more particularly, inner release agents, such as carboxylic esters and/or amides prepared by esterifying or amidating a mixture of montanic acid and at least one aliphatic carboxylic acid of 10 or more carbon atoms with at least difunctional alkanolamines, polyols and/or polyamines having molecular weights of 60 to 400 g/mol, as disclosed in EP 153 639 for example, mixtures of organic amines, metal salts of stearic acid and organic mono- and/or dicarboxylic acids or their anhydrides, as disclosed in DE-A-3 607 447 for example, or mixtures of an imino compound, the metal salt of a carboxylic acid and optionally a carboxylic acid, as disclosed in U.S. Pat. No. 4,764,537 for example. Preferably, reaction mixtures according to the present invention comprise no further release agents.

Useful fillers, especially reinforcing fillers, are the well-known, customary organic and inorganic fillers, reinforcing agents, weighting agents, coating agents, and so on. Specific examples are inorganic fillers, such as silicated minerals, for example sheet-silicates, such as antigorite, bentonite, serpentine, hornblends, amphiboles, chrisotile and talc, metal oxides, such as kaolin, aluminum oxides, titanium oxides, zinc oxide and iron oxides, metal salts such as chalk and barite, and inorganic pigments, such as cadmium sulfide, zinc sulfide and also glass and others. Preference is given to using kaolin (china clay), aluminum silicate and coprecipitates of barium sulfate and aluminum silicate. Useful organic fillers include for example carbon black, melamine, rosin, cyclopentadienyl resins and graft polymers and also cellulose fibers, polyamide fibers, polyacrylonitrile fibers, polyurethane fibers, polyester fibers based on aromatic and/or aliphatic dicarboxylic esters and especially carbon fibers.

The organic and inorganic fillers can be used individually or as mixtures and are advantageously added to the reaction mixture in amounts of 0.5 to 50 wt %, preferably 1 to 40 wt %, based on the weight of components (a) to (d). Preferably, no fillers are used.

The present invention further provides a process for producing polyurethane shoe soles having an article density of 100 to 350 g/L, which comprises reacting the prepolymer of components (a), (b) and optionally (d) and also optionally further isocyanates with the isocyanate-reactive components (c) and optionally (b), (d), (e) and/or (f) in the second step in amounts such that the equivalence ratio of NCO groups to total reactive hydrogen atoms in this step is in the range from 0.8:1 to 1.5:1, preferably in the range from 1:1 to 1.3:1 and especially in the range from 1.02:1 to 1.15:1. A ratio of 1:1 corresponds to an isocyanate index of 100. Isocyanate index in the context of the present invention is to be understood as meaning the stoichiometric ratio of isocyanate groups to isocyanate-reactive groups, multiplied by 100. The isocyanate-reactive components (c) and optionally (b), (d), (e) and/or (f) added in the second step are customarily termed "curative". The mixing ratios of isocyanate-terminated prepolymer to the curative are preferably 100 parts by weight:less than 10 parts by weight and more preferably 100 parts by weight:less than 8 parts by weight. This ratio of isocyanate-terminated prepolymer to curative can be set for example via the proportion of polyols (b) and crosslinking and/or chain-extending agents (d) in the curative or, respectively, in the isocyanate-terminated prepolymer.

The polyurethane shoe soles of the present invention are preferably produced by the two-shot process and low-pressure technology in closed, advantageously temperature-controlled molds. The molds usually consist of metal, for example aluminum or steel. These methods of operation are described for example by Piechota and Röhr in "Integralschaumstoff", Carl-Hanser-Verlag, Munich, Vienna, 1975, or in "Kunststoff-handbuch", volume 7, Polyurethane, 3rd edition, 1993, chapter 7.

The isocyanate-terminated prepolymer and the curative are preferably mixed at a temperature of 15 to 110° C. for this. It is particularly preferable for the prepolymer and the curative to be mixed with each other at a temperature of 60-100° C. and 20-60° C. respectively. The reaction mixture is subsequently introduced into the mold, optionally under elevated pressure. Mixing can be effected mechanically using a stirrer or stirring screw. Mold temperature is advantageously in the range from 20 to 160° C., preferably in the range from 40 to 120° C. and more preferably in the range from 70 to 110° C. Reaction mixture in the context of the invention is the term given to the mixture of isocyanate-terminated prepolymers, blowing agents (c) and the optionally included components (b), (d), (e) and (f) at reaction conversions below 90%, based on the isocyanate groups of the prepolymer component. The amount of reaction mixture introduced into the mold is determined such that the article density of the polyurethane shoe sole according to the present invention is in the range from 100 to 350 g/L, preferably in the range from 120 to 280 g/L, more preferably in the range from 130 to less than 250 g/L and especially in the range from 150 to 220 g/L. The amount of the system which is used is chosen so as to obtain a consolidation factor of preferably 1.1 to 8, more preferably 1.4 to 5 and especially 1.4 to 3.

Alternatively, the reaction mixture can also be foamed freely, for example in troughs or on a belt, to give polyurethane foams having a density of 100 to 350 g/L, preferably 120 to 280 g/L, more preferably 130 to less than 250 g/L and especially 150 to 220 g/L. The polyurethane foam slab thus obtained can then be cut, diecut, shaved and/or thermoformed for example, optionally together with further materials, such as optionally further polyurethane foams or ethylene-vinyl acetate, to shape the shoe soles or shoe sole parts.

The polyurethane shoe soles of the present invention are preferably used as midsole, for example for general purpose footwear, sport shoes, sandals and boots. More particularly, the polyurethane shoe soles of the present invention are used as midsole for sport shoes. A shoe sole according to the present invention further also comprises shoe sole parts, for example heel parts or ball parts. Shoe soles of the present invention can also be used as insert soles or combisoles.

A process according to the present invention leads to polyurethane shoe soles having outstanding mechanical properties. More particularly, the polyurethane shoe soles of the present invention display high rebound resilience coupled with high hardnesses and low densities. It is further advantageous that especially on using polyols (b) having a maximum functionality of 2.2 and omitting crosslinkers, the polyurethane shoe soles obtained can be thermoformed. The polyurethane shoe soles obtained can further be recycled by remelting and thermoplastic processing, for example together with thermoplastic polyurethane. Finally, the use of hybrid materials is advantageous. In hybrid materials, a polyurethane element according to a process of the present invention is combined with other materials of construction, for example EVA, so as to obtain a structure comprising one or more layers consisting of the polyurethane according to the present invention under, over or between layers of other materials of construction.

The examples which follow illustrate the invention.

EXAMPLES

Materials Used

Polyol 1: polytetrahydrofuran having an OH number of 56 mg KOH/g

Polyol 2: polyetherol based on glycerol, propylene oxide and ethylene oxide, having an OH number of 27 mg KOH/g and a viscosity of 5270 mPas at 25° C.

Polyol 3: polymer polyol based on glycerol as starter and propylene oxide and ethylene oxide, having an OH number of 19 mg KOH/g and a dispersed solid styrene-acrylonitrile fraction of about 45 wt %

Polyol 4: polyesterol based on adipic acid, monoethylene glycol and butanediol, having an OH number of 56 mg KOH/g Polyol 5: Hoopol® PM 445 from Synthesia (polymer polyester polyol having an OH number of about 60)

Polyol 6: polyesterol based on adipic acid, butanediol, and 2-methyl-1,3-propanediol, having an OH number of 56 mg KOH/g Polyol 7: polyesterol based on adipic acid, monethylene glycol, and butanediol having an OH number of 80 mg KOH/g CE 1: monoethylene glycol CE 2: 1,4-butanediol Cross 1: trifunctional crosslinker with an OH number of 1160 mg KOH/g Cross 2: trifunctional crosslinker with an OH number of 1825 mg KOH/g Cross 3: trifunctional crosslinker with an OH number of 1254 mg KOH/g Stabi 1: polyethermethylsiloxane from Air Products Stabi 2: shear stabilizer based on polyethersiloxanes Stabi 3: cell stabilizer based on polyethersiloxanes Stabi 4: cell regulator from Goldschmidt Stabi 5: 50% solution of sodium salt of sulfated castor oil in water Stabi 6: 2,2',6,6'-tetraisopropyldiphenylcarbodiimide Stabi 7: mixture of fatty acid polyglycol esters and amine salts of alkylbenzenesulfonic acids
Stabi 8: polyethermethylsiloxane
Stabi 9: fatty acid ethoxylate
KAT 1: Lupragen® N203 from BASF Polyurethanes
KAT 2: bis(2-dimethylaminoethyl) ether, 70% solution in dipropylene glycol
KAT 3: catalyst based on bismuth
KAT 4: catalyst based on imidazole compounds
KAT 5: delayed action catalyst based on triethylenediamine
KAT 6: catalyst based on a mixture of 30 wt % pentamethyldiethylenetriamine and 70 wt % N-methyl-N'-(dimethylaminoethyl)piperazine
ISO 1: conventional isocyanate prepolymer based on MDI with a difunctional polyetherol and an NCO content of 14%
ISO 2: conventional isocyanate prepolymer based on MDI with a difunctional polyesterol and an NCO content of 23%
ISO 3: 4,4'-MDI
ISO 4: 4,4'-MDI and carbodiimide-modified 4,4'-MDI
ISO 5: prepolymer based on ISO 3, ISO 4 and Polyol 7
Preparation of ISO 5:

A 2 L 4-neck flask equipped with a blade stirrer, a thermometer, nitrogen inlet means was initially charged with 592.6 g of ISO 3 and 240.00 g of ISO 4 and the initial charge was heated to 60° C. At 60° C., altogether 1167.2 g of Polyol 7 were added a little at a time over a period of 30 minutes under agitation. After all components had been added, the mixture was heated to a temperature of 80° C. and stirred at 80° C. for 2 hours. This was followed by cooling down to room temperature and determination of the prepolymer's NCO content 24 hours later (10.2%).

Use Examples B1 and B4

Example B1 a) Using 4,4'-MDI to Prepare a Prepolymer Comprising Isocyanate Groups

A mixture of 1000 parts by weight of Polyol 4 and 1.8 parts by weight of Stabi 1 was heated to 145° C. and admixed, and reacted, at 145° C. with 394 parts by weight of ISO 3 under intensive agitation.

The prepolymer obtained had an NCO content of 6.13% and a viscosity of 1800 mPas at 80° C. (measured using a rotary viscometer).

b) Production of Shaped Polyurethane Articles

A curative component consisting of
100 parts by weight of Stabi 5
40 parts by weight of Stabi 6
1.2 parts by weight of Stabi 7
4 parts by weight of Stabi 8
and
0.6 parts by weight of KAT 6.

100 parts by weight of the temperature-controlled isocyanato-containing prepolymer at 86° C. were intensively stirred with 3.5 parts by weight of the temperature-controlled curative component at 50° C. for about 10 seconds. The reaction mixture was thereafter introduced into a temperature-controlled sealable metallic mold having the dimensions 21 cm×11 cm×3 cm at 83° C., the mold was sealed and the reaction mixture was allowed to cure. After 18 min the shaped microcellular article was demolded and conditioned at 100° C. for 24 h for thermal postcuring.

Example B4 a) Using 4,4'-MDI to Prepare a Prepolymer Comprising Isocyanate Groups

A mixture of 1000 parts by weight of Polyol 6 and 0.3 parts by weight of Cross 3 was heated to 142° C. and admixed, and reacted, at 142° C. with 410 parts by weight of ISO 3 under intensive agitation.

The prepolymer obtained had an NCO content of 6.48% and a viscosity of 1540 mPas at 80° C. (measured using a rotary viscometer).

b) Production of Shaped Polyurethane Articles

A curative component consisting of
100 parts by weight of Stabi 5
50 parts by weight of Stabi 6
1.2 parts by weight of Stabi 7
4 parts by weight of Stabi 8
20 parts by weight of Stabi 9
and
0.3 parts by weight of KAT 6.

100 parts by weight of the temperature-controlled isocyanato-containing prepolymer at 80° C. were intensively stirred with 4.6 parts by weight of the temperature-controlled curative component at 52° C. for about 10 seconds. The reaction mixture was thereafter introduced into a temperature-controlled sealable metallic mold having the dimensions 21 cm×11 cm×3 cm at 79° C., the mold was sealed and the reaction mixture was allowed to cure. After 19 min the shaped microcellular article was demolded and conditioned at 100° C. for 24 h for thermal aftertreatment. The properties of the polyurethane shoe soles obtained are reported in table 1.

TABLE 1

|  | B1 | B1 | B4 |
|---|---|---|---|
| Prepolymer preparation starting temperature [° C.] | 145 |  | 142 |
| Index | 110 |  | 105 |
| Free density [g/l] | 123 |  | 99 |
| Article density [g/l] | 220 | 185 | 160 |
| Hardness [Asker C] | 50 | 38 | 30 |
| Rebound resilience [%] | 48 | 47 | 26 |
| Compression set [%] | 6 | 10 | 9.5 |
| Tensile strength [N/mm$^2$] | 1.3 |  |  |
| Elongation [%] | 257 |  |  |
| Tongue tear resistance [N/mm] | 2.1 |  |  |
| Storage energy Ws [Nm] | 0.73 | 0.5 | 0.36 |
| Damping [%] | 24 | 24 | 21 |
| Stiffness c [N/mm] | 171 | 45 | 28 |

Comparative Examples V1 to V3

The polyol mixtures for comparative examples 1-3 were prepared as per table 2. The polyol mixtures were mixed together with the corresponding conventional isocyanate prepolymers on an EMB F20 low-pressure polyurethane machine and introduced into a mold measuring 20 cm×20 cm×1 cm, so an article having a density as per table 2 was formed. In the case of V3, the mold was equipped with an additional opening, so air was better able to escape.

TABLE 2

|            | V1     | V2     | V3     |
|------------|--------|--------|--------|
| Polyol 1   | 78.696 |        |        |
| Polyol 2   |        | 59.060 |        |
| Polyol 3   | 9.644  | 28.870 |        |
| Polyol 4   |        |        | 41.403 |
| Polyol 5   |        |        | 41.403 |
| CE 1       | 8.294  | 7.040  | 11.690 |
| CE 2       |        | 2.260  |        |
| Cross 1    | 0.241  |        |        |
| Cross 2    |        |        | 0.487  |
| KAT 1      | 1.447  | 1.100  | 0.292  |
| KAT 2      | 0.289  | 0.510  |        |
| KAT 3      |        | 0.06   |        |
| KAT 4      | 0.145  |        |        |
| KAT 5      |        |        | 1.656  |
| Stabi 1    | 0.183  |        |        |
| Stabi 2    |        |        | 0.487  |
| Stabi 3    |        |        | 0.487  |
| Stabi 4    |        |        | 0.974  |
| Water      | 1.061  | 1.100  | 1.120  |
| Temperature of components [° C.] | 25 | 45 | 45 |
| Prepolymer | ISO 1  | ISO 1  | ISO 2  |
| Index      | 96     | 98     | 95     |
| Cream time [s] | 7  | 6      | 8      |
| Full rise time [s] | 43 | 34 | 60    |
| Free density [g/L] | 151 | 137 | 126  |
| Article density [g/L] | 250 | 250 | 210 |
| Hardness [Asker C] | 55 | 55  | 49    |
| Rebound resilience [%] | 26 | 41 | 26 |
| Compression set [%] | 22 | 13 | 20    |

Use Examples B2 and B3

PU Hybrid Foam

Similarly, combining foams of the present invention with normal polyurethane systems can lead to products having improved properties. For this, a 4 mm thick sheet of inventive foam B1 was introduced into a mold having the dimensions 20 cm×20 cm×1 cm. The mixture of comparative example 1 was then applied to this foam, so a shaped article having a density of 216 g/L was formed.

|                        | B1 | V1 | B2 | B3 |
|------------------------|----|----|----|----|
| Rebound resilience [%] | 48 | 26 | 40 | 36 |

The only difference between examples B2 & B3 is that with testing the B2 material on the test side it was the B1 material and with B3 it was the V1 material which formed the face side. As is clear from the examples, combining the shaped articles of the present invention with other materials is advantageous.

Use Example B5

Hybrid Formed from PU and EVA

A shoe sole was produced from two plies. One ply consisted of EVA, the other of inventive foam B1. The two plies had the same thickness.

|                     | EVA | B5 |
|---------------------|-----|----|
| Compression set [%] | 86  | 47 |

The result does not depend on whether the EVA ply is on top or bottom in the test. It is again found that combining the shaped articles of the present invention with other materials is advantageous.

Use examples B6 and comparative example V4: mixtures of conventional shoe foam components; prepolymers and curatives.

V4: conventionally prepared prepolymer as is standard in the production of prepolymers for the shoe industry (ISO 5), having an NCO content of 10.2%, is mixed with a curative component as from use example B1.

B6: prepolymer corresponding to use example B1 mixed in a ratio of 1:1 with the conventional shoe foam prepolymer from use example V4, then mixed with a curative component as from use example B1.

|                               | V4   | B6   |
|-------------------------------|------|------|
| Index                         | 105  | 105  |
| Article density [g/l]         | 299  | 189  |
| Rebound resilience [%]        | 30   | 39   |
| Compression set [%]           | 17.8 | 11.3 |
| Tensile strength [N/mm$^2$]   | 2.4  | 1.4  |
| Elongation [B1] [%]           | 235  | 285  |
| Storage energy Ws [Nm]        | 2.2  | 0.75 |
| Damping [%]                   | 38   | 30   |
| Stiffness c [N/mm]            | 354  | 147  |

We claim:

1. A process for producing a polyurethane shoe sole having an article density of 100 to 350 g/L, in which components comprising the following are mixed and/or reacted:
   a) an organic polyisocyanate,
   b) a polyol,
   c) a blowing agent comprising water, and optionally
   d) a crosslinking and/or chain-extending agent,
   e) a catalyst, and
   f) at least one auxiliary and/or additive,
   the process comprising
   (1) mixing and reacting at least part of polyisocyanate (a), at least part of polyol (b) and at least part of crosslinking and/or chain-extending agent (d) if present, at a temperature of 130° C. to 180° C. to give a prepolymer having isocyanate terminal groups and
   (2) mixing the isocyanate-terminated prepolymer obtained and any remaining polyisocyanate (a) with the blowing agent comprising water (c), any remaining polyol (b) and any remaining crosslinking and/or chain-extending agent (d) if present, and catalyst (e) if present and at least one auxiliary and/or additive (f) if present, to form a mixture, and introducing the mixture into a mold and allowing the mixture to fully react to give a polyurethane shoe sole.

2. A process for producing a polyurethane shoe sole in which components comprising the following are mixed and/or reacted:
   a) an organic polyisocyanate,
   b) a polyol,
   c) a blowing agent comprising water, and optionally
   d) a crosslinking and/or chain-extending agent,
   e) a catalyst, and
   f) at least one auxiliary and/or additive,
   the process comprising
   (1) mixing and reacting at least part of polyisocyanate (a), at least part of polyol (b) and at least part of crosslinking and/or chain-extending agent (d) if present, at a temperature of 130° C. to 180° C. to give a prepolymer having isocyanate terminal groups and (2) mixing the isocyanate-terminated prepolymer obtained and any remaining polyisocyanate (a) with the blowing agent comprising water (c), any remaining polyol (b) and any remaining crosslinking and/or chain-extending agent (d) if present, and catalyst (e) if present and at least one auxiliary and/or additive (f) if present, to form a mixture, the mixture being allowed to fully react to form a polyurethane foam having a density of 100 to 350 g/L and shaping a polyurethane shoe sole out of the polyurethane foam.

3. The process according to claim 1 or 2, wherein the isocyanate-functional prepolymer has an NCO group content of 2 to 20 wt %.

4. The process according to claim 1 or 2, wherein the isocyanate index in (2) is from 80 to 150.

5. The process according to claim 1 or 2, wherein not less than 80 wt % of said polyol (b) is converted in (1) into the prepolymer comprising isocyanate groups.

6. The process according to claim 1 or 2, wherein not less than 95 wt % of said polyisocyanate (a) is converted in (1) into the prepolymer comprising isocyanate groups.

7. The process according to claim 1 or 2, wherein not less than 80 wt % of said crosslinking and/or chain-extending agent (d) is added to the prepolymer comprising isocyanate groups.

8. The process according to claim 1 or 2, wherein said polyol (b) comprises a polyester polyol having an average functionality of 1.9 to 2.2 and a number-average molecular weight of 800 to 3000 g/mol.

9. A polyurethane shoe sole obtained according to claim 1 or 2.

10. The polyurethane shoe sole according to claim 9, which is an insert sole.

11. The process according to claim 1 or 2, wherein the shoe sole has a hardness of 15 to 75 Asker C, measured to JIS K 7312.

12. The process according to claim 1 or 2, wherein the shoe sole has a tensile strength of above 0.5 N/mm$^2$, measured to DIN 53504.

13. The process according to claim 1 or 2, wherein the shoe sole has an elongation of above 100%, measured to DIN 53504.

14. The process according to claim 1 or 2, wherein the shoe sole has a rebound resilience of 20 to 70%, measured to DIN 53512.

15. The process according to claim 1 or 2, wherein the shoe sole has a tongue tear strength of above 1 N/mm, measured to ASTM D3574.

16. The process according to claim 1 or 2, wherein the shoe sole has a compression set of below 20%, measured in line with DIN EN ISO 1856.

17. The process according to claim 1 or 2, wherein the shoe sole has a stiffness c of below 1000 N/mm.

18. The process according to claim 1 or 2, wherein the shoe sole has a damping D of below 50%.

19. The process according to claim 1 or 2, wherein the shoe sole has a density of from 150 to 220 g/L.

20. The process according to claim 1 or 2, wherein the temperature is 140 to 155° C.

* * * * *